United States Patent [19]

Lewis

[11] 4,254,748

[45] Mar. 10, 1981

[54] IGNITION SYSTEMS FOR INTERNAL COMBUSTION SYSTEM

[75] Inventor: David H. Lewis, London, England

[73] Assignee: Lumenition Limited, London, England

[21] Appl. No.: 959,454

[22] Filed: Nov. 13, 1978

[30] Foreign Application Priority Data

Apr. 6, 1978 [GB] United Kingdom ............... 13545/78

[51] Int. Cl.³ ................................................. F02P 5/04
[52] U.S. Cl. ................................................ 123/117 D
[58] Field of Search ........................ 123/117 D, 117 R

[56] References Cited

U.S. PATENT DOCUMENTS 4,119,069  10/1978  Perrin ............................... 123/117 D
4,127,092  11/1978  Fresow ............................. 123/117 D

*Primary Examiner*—Ronald B. Cox
*Attorney, Agent, or Firm*—Larson, Taylor and Hinds

[57] ABSTRACT

A digital electronic ignition system employing two triggers for generating first and second voltage signals in response to engine revolutions. A first counter counts the number of second signal pulses during a predetermined interval of time from a given point in relation to the engine crank-shaft position. A memory which is operative from the first counter, includes a program or the desired advance of retard of the ignition timing, and operates a second counter to count said second signal pulses up to the number stored in the memory in order to initiate engine ignition at the optimum crank-shaft position.

16 Claims, 4 Drawing Figures

IGNITION SYSTEMS FOR INTERNAL COMBUSTION SYSTEM

FIELD OF THE INVENTION

The present invention relates to ignition systems for internal combustion engines and in particular to a digital electronic system for controlling the ignition timing of an internal combustion engine.

DESCRIPTION OF THE PRIOR ART

Various types of both analog and digital systems for controlling the ignition timing are known.

In an analog system disclosed in U.S. Pat. No. 3,952,178, two sets of pulses are generated in synchronism with the engine, a first set of high frequency pulses being utilized to form a voltage output from a tachometer, the magnitude of which is inversely proportional to engine speed, thus, the faster the engine speed is, the smaller is the magnitude of the output voltage. A second set of low frequency pulses is utilized in conjunction with the first set to generate a staircase voltage. A circuit is triggered in each cycle as soon as the staircase voltage exceeds the output voltage from the tachometer. This system enables the timing of the spark to be advanced as a function to engine speed.

Analog systems suffer from the main disadvantage that their accuracy can be effected by voltage fluctuations and also that their response time is relatively slow.

Digital systems for controlling ignition timing are numerous, one example being disclosed in U.S. Pat. No. 3,981,282 in which the advance and retard of the spark for ignition is achieved electronically by generating two series of pulses in synchronism with the engine using one series as a reference for maximum advance and the other series to operate a counter to count down the requisite number of pulses beyond the maximum advance point before the spark is initiated, the count of the counter being varied from a computer in accordance with speed and/or load on the engine.

Another type of more complicated digital system is disclosed in U.S. Pat. No. 3,749,073. This digital system utilizes electronic circuitry to vary the timing of ignition pulses in response to engine speed and vacuum. In particular this system employs read only memories, one such memory being programmed with a spark advance versus engine speed curve. However, such a system suffers from the disadvantage that it involves a large number of electronic components which not only makes it prone to frequent failure, but is too costly to be fitted in road vehicles.

Moreover, those known digital systems which employ monostable or other time dependent devices are not accurate enough for use in high performance engines.

SUMMARY OF THE INVENTION

It is therefore an object of the present invention to provide an electronic system for controlling the ignition timing of an internal combustion engine which is a development on the double trigger theme proposed in U.S. Pat. No. 3,981,282.

It is a further object of the invention to provide a simple and reliable system using a minimum of electronic components, compared with the known analog and digital systems of the prior art.

According to the present invention there is provided a digital electronic ignition system for controlling the ignition timing of an internal combustion engine including; means for generating first and second engine related square wave pulses, the first being in synchronism with the crank-shaft revolutions, whilst the second is a multiple frequency thereof; first means for counting the number of second frequency pulses in a given predetermined time from a first crank-shaft position after top dead centre; means for storing this count; second means for counting the second frequency pulses from a second predetermined crank-shaft position before top dead centre in the next firing cycle up to the stored count; and means for initiating the spark when said count has been completed.

BRIEF DESCRIPTION OF THE DRAWINGS

The present invention will now be described in greater detail by way of example with reference to the accompanying drawings, wherein.

DESCRIPTION OF THE PREFERRED EMBODIMENTS

Figure 1:
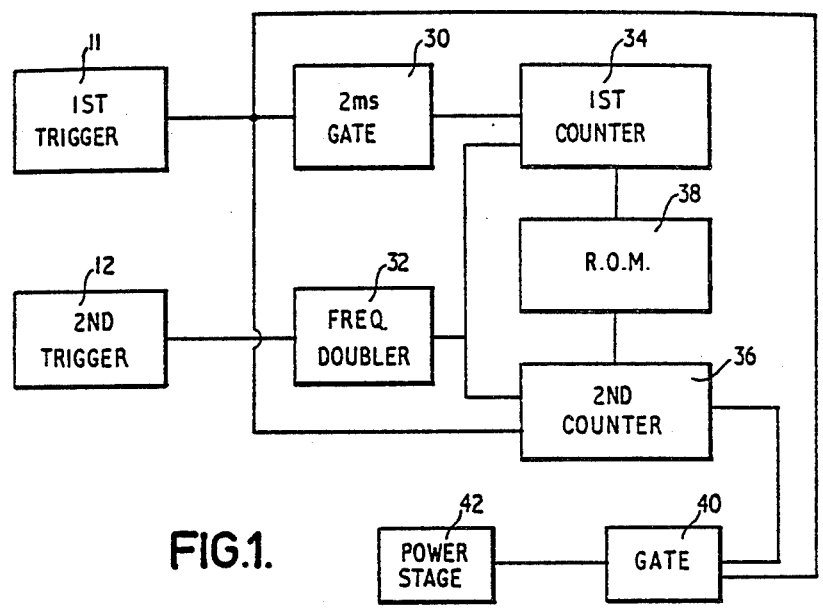
FIG. 1 is a block diagram of one preferred form of a digital electronic ignition system for controlling the ignition timing of an internal combustion engine.

Referring first to the block diagram shown in FIG. 1, the digital electronic ignition system includes first and second bistable triggers 11 and 12 of the type disclosed in U.S. Pat. No. 3,981,282; a 2 millisecond gate circuit 30; a frequency doubler 32; first and second counters 34 and 36; a read only memory 38 (hereinafter referred to as a ROM); a gate circuit 40; and a power stage 42.

Figure 3:
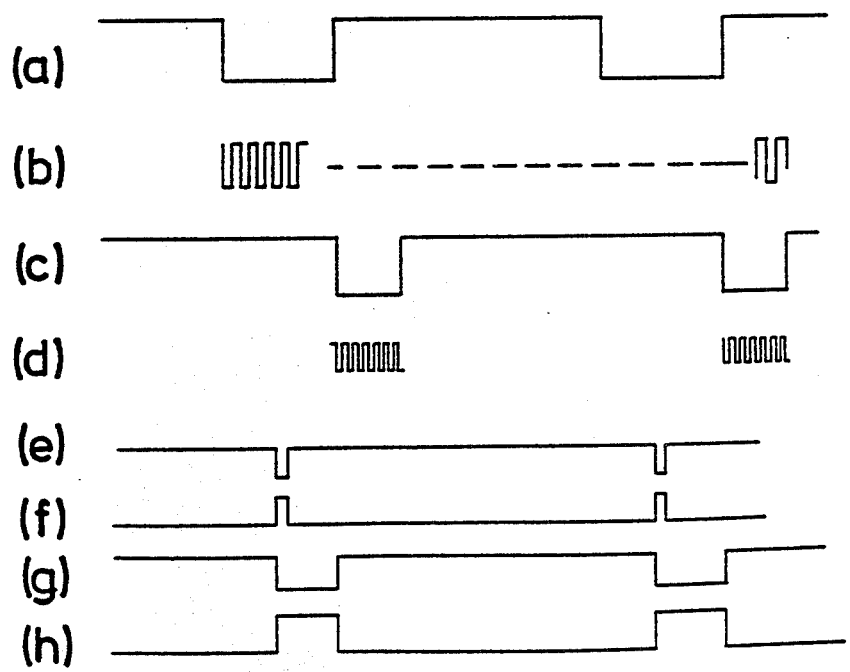
FIG. 3 shows a series of waveforms illustrating the operation of the digital ignition system.

The waveforms shown at (a) and (b) of FIG. 3 are the output waveforms from the respective first and second triggers 11 and 12. It will however be noted that the waveform (a) shown in FIG. 3 is inverted with respect to that shown in FIG. 6 (waveform a) of U.S. Pat. No. 3,981,282, this being achieved by either adding or subtracting one transistor from the chain of inverse switching transistors included within the trigger.

The output from the first trigger 11 is fed to the 2 millisecond gate 30; the gate circuit 40 and the second counter 36. The output from the second trigger 12 is fed to the frequency doubler circuit 32 and thence to both counters 34 and 36. The precise operation of the counters and the ROM 38 will be described in greater detail with reference to FIG. 2. The gate 40 receives on one input the output from the second counter 36 and on the other input the waveform (a) from the first trigger 11.

Figure 2:
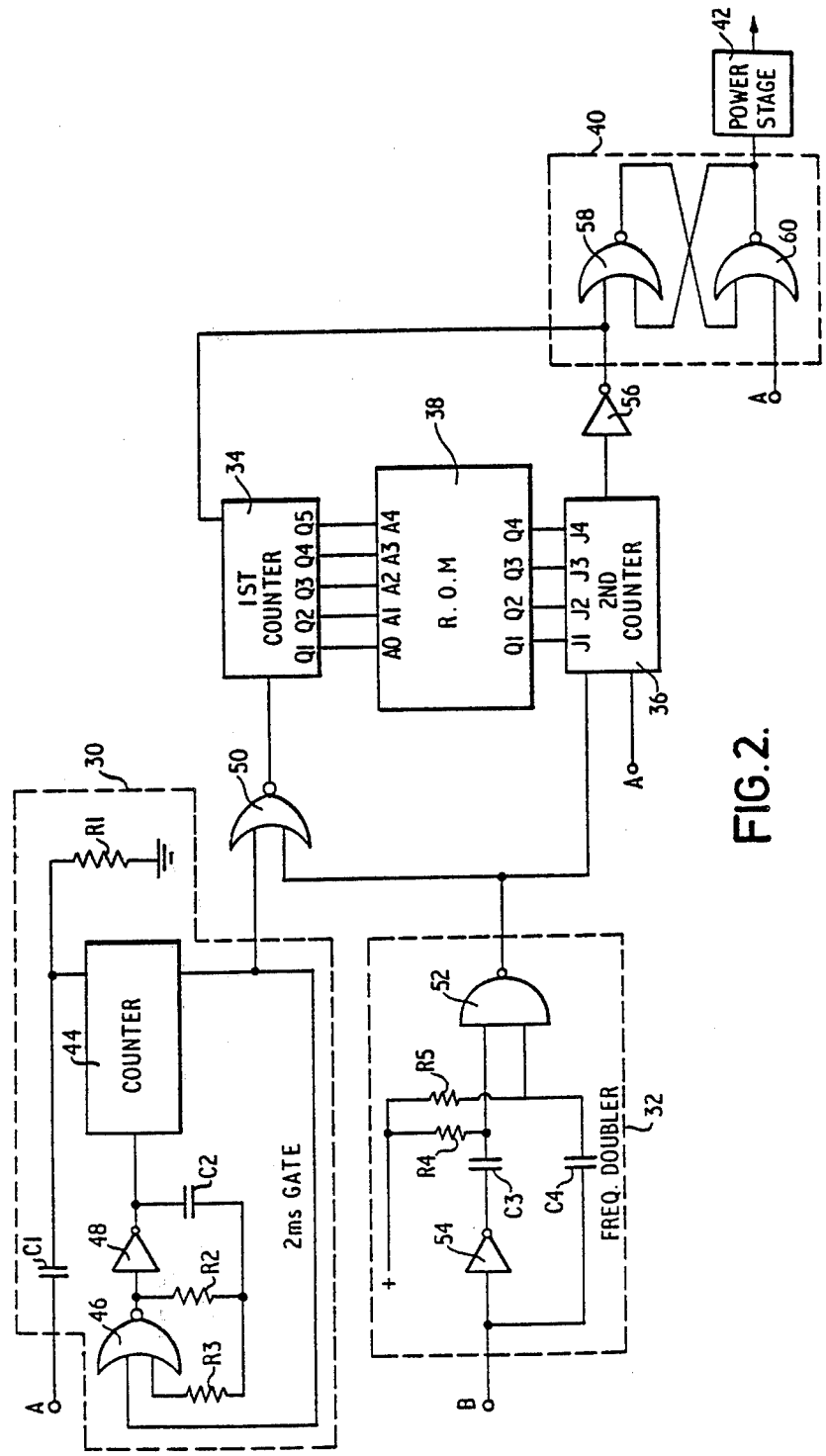
FIG. 2 is a detailed circuit diagram of the memory system and counter arrangements used in the system shown in FIG. 1.

Referring now to FIG. 2, the 2 millisecond gate 30 comprises a counter 44, a NOR gate 46, an inverter 48, resistors R1, R2 and R3 and capacitors C1 and C2. The output from the first trigger 11 is applied to the reset input of the counter 44 via a terminal A and the capacitor C1. The NOR gate 46, inverter 48, capacitor C2 and the resistors R2 and R3 form an oscillator circuit which is connected to the clock input of the counter 44. The output of the counter 44 is fed to one input of a NOR gate 50 and also to one input of the NOR gate 46.

The frequency doubler circuit 32 comprises a NAND gate 52, an inverter 54, capacitors C3 and C4, and resistors R4 and R5. The output from the second trigger 11 is applied to the circuit 32 through a terminal B. The frequency doubler circuit 32 consists of two parallel circuits each connected to an input of the NAND gate 52. The first circuit includes the inverter 54 and a differentiator formed by the capacitor C3 and resistor R4. The second circuit consists only of a differentiator formed by the capacitor C4 and the resistor R5. Each differentiator thus produces a series of alternate positive and negative going spikes the two series being 180° out of phase with respect to each other, so that the two inputs to the NAND gate 52 simultaneously receive spikes of opposite polarity. The output from the NAND gate 52 is thus a logic 1 when the inputs are both zero and a logic 0 when the opposite polarity spikes are applied to its two inputs. The frequency is doubled because a spike is produced at each edge of the original waveform (b). The output from the NAND gate 52 is applied to the second input of the NOR gate 50 and also to the clock input of the second counter 36.

The first counter 34 receives the output from the NOR gate 50 on its clock input, this consisting of a train of pulses output from the NAND gate 52 during the time that the NOR gate 50 is enabled from the output of the 2 millisecond circuit 30. The first counter has five outputs Q1 to Q5 which are applied to respective inputs A1 to A4 of the ROM 38. The ROM 38 has four outputs Q1 to Q4 which are applied to respective inputs J1 to J4 of the second counter 36. The reset input of the second counter 36 is connected to the output of the first trigger 11 through a terminal A. The output of the second counter 36 is applied to the gate circuit 40 through an inverter 56, the inverter output being applied to the reset input of the first counter 34.

The gate circuit 40 comprises a pair of NOR gates 58 and 60. The output of the inverter 56 is applied to the first input of the NOR gate 58, whilst the output from the second NOR gate 60 is applied to the second input of the NOR gate 58. The output of the inverter 58 is applied to the first input of the NOR gate 60, whilst the output from the first trigger 11 is applied to the second input of the NOR gate 60. The output of the second NOR gate 60 is applied to the power stage 42.

The power stage 42 comprises an inverter and a power Darlington pair whose collector-emitter path is connected in series with the primary winding of the ignition coil, and is constructed in similar manner to that disclosed in U.S. Pat. No. 3,981,282.

The operation of the circuit shown in FIG. 2 will now be described in greater detail with reference to the waveforms shown in FIG. 3. The trailing edge of waveform (a) occurs at 44° BTDC and the leading edge at 12° ATDC, these angles being crank-shaft angles. The leading edge of the waveform (a) thus triggers the 2 millisecond circuit 30 by enabling the counter 44. The counter is designed to give a negative going output pulse shown by waveform (c) which lasts for 2 milliseconds from the crank-shaft position of 12° ATDC. On being enabled, it counts 32 pulses generated by the oscillator and then terminates the output pulses and blocks the operation of the oscillator through the NOR gate 46.

During the period of the 2 millisecond pulse shown at waveform (c), the NOR gate 50 is enabled to permit a series of pulses shown at waveform (d) to be applied to the clock input of the counter 34, these pulses being the doubled frequency pulses of the second trigger pulses shown in waveform (b). The number of pulses of the waveform (d) applied to the first counter 34 will be directly proportional to the speed of the engine.

The first counter 34 counts the number of pulses in the waveform (d), and this count is stored in the ROM 38.

At 44° BTDC, the second counter 36 is enabled, its preset count latched thereinto from the count stored in the ROM 38. On being enabled the second counter 36 counts the doubled pulses of waveform (b) output from the NAND gate 52 until the preset count is reached when its outputs a negative going pulse as shown in waveform (e). This output is inverted by the inverter 56 to produce a positive going pulse shown in waveform (f). The gate circuit 40 is designed such that the output from the NOR gate 58 is shown by waveform (g) whilst the output from the NOR gate 60 is shown by waveform (h). The output from the NOR gate 60 is thus a logic 1 to provide a coil "off" signal during the period that its two inputs receive a logic 0 as determined by waveforms (a) and (g). The outputs from the NOR gate 60 is a logic 0 whenever one of the signals on its input is a logic 1 in order to provide a coil "on" signal.

The leading edge of the waveform (h) thus determines the exact point of ignition advance whilst the trailing edge determines the coil "on" position which always occurs at 12° ATDC.

Figure 4:
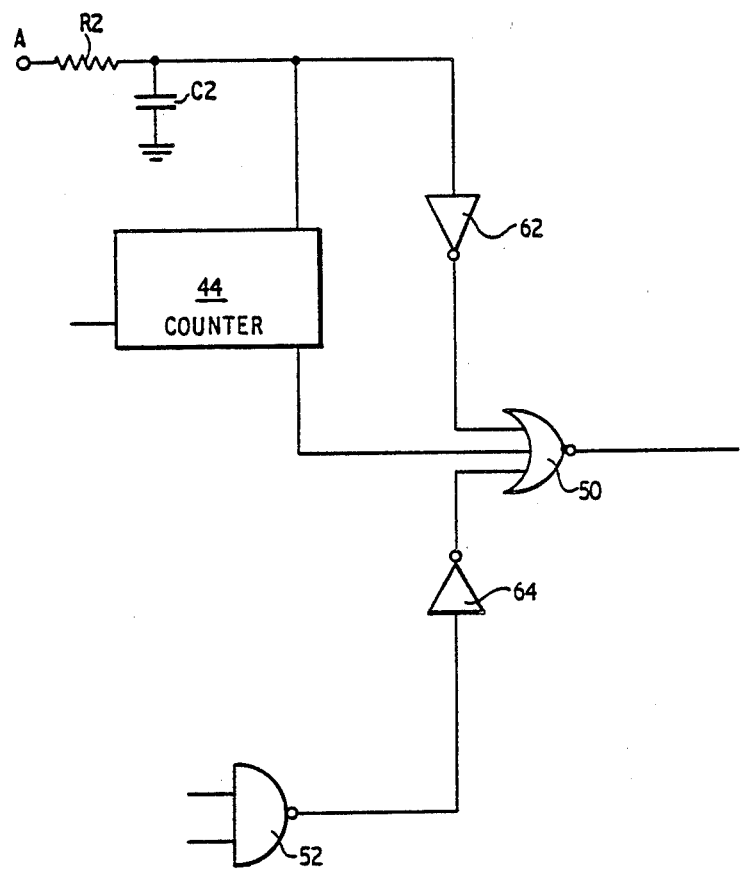
FIG. 4 is part of a circuit diagram of a modified system.

Referring now to FIG. 4, the improvement shown in the modified circuit is designed to prevent the 2 millisecond gate 30 from being accidentally triggered by noise.

Instead of providing the differentiating capacitor C1 and resistor R1, the input circuit to the counter 44 from the first trigger 11 includes a series resistor R2 and a capacitor C2 connected between the reset terminal of the counter 44 and earth. The NOR gate 50 has three inputs, the third input being from the first trigger 11 through the resistor R2 and an inverter 62. An inverter 64 is connected between the output of the NAND gate 52 and the second input to the NOR gate 50. The output from the NOR gate 50 will be a logic 1 if and only if a logic 0 is present on all three inputs. At the point 12° ATDC the signal from the first trigger becomes a logic 1 and the counter 44 is started and outputs a logic 0 for 2 milliseconds. Also at the same time a logic 0 is applied to the third input of the NOR gate 50. The doubled frequency pulses from the output of the NAND gate 52 after inversion in the inverter 64 pass through the NOR gate 50 for the duration of the 2 millisecond pulse. The need for the inverter 64 is to ensure that the modified embodiment is equivalent to the embodiment shown in FIG. 2 with regard to the counter stored in the ROM 38.

It will be understood that by the terms "leading" and "trailing" edges is meant those positions at which the waveform changes from a logic 0 to a logic 1 and from a logic 1 to a logic 0 respectively.

It should be noted that as the ROM is merely for a 128-bit capacity, it may prove economically feasible to employ a 1024-bit memory which may be programmed to fit eight separate advance curves, external connections making this possible.

What I claim and desire to secure by Letters Patent is:

1. An electronic system for controlling the ignition timing of an internal combustion engine, said system including: means for generating separate first and second voltage signals in response to revolutions of the engine, each of said signals comprising pulses which change between first and second voltage levels at a predetermined constant frequency per engine revolution with the frequency of said second signal pulses being substantially greater than the frequency of said first signal pulses; first counting means for counting the number of said second signal pulses and producing a first output signal representative thereof; means for activating said first counting means for a predetermined time period in response to said first signal changing from said first voltage level at a first predetermined crank-shaft position to said second voltage level, whereby said first counting means counts the number of said second signal pulses over said predetermined time period and said first output signal is representative of the engine speed; memory means, including a program representative of the desired advance or retard of the ignition timing as a function of engine speed in accordance with the requirements of the engine, for producing, in response to said first output signal, a second output signal representative of the number of second signal pulses required to provide the desired ignition timing; second counting means for counting said second signal pulses and initiating engine ignition after a preset number of said second signal pulses have been counted; means for adjusting said preset number in response to said second output signal in accordance with engine requirements as determined during the previous firing cycle; and means for activating said second counting means in response to said first signal changing from said second voltage level to said first voltage level at a second predetermined crank-shaft position, whereby engine ignition is initiated when said preset number of said second signal pulses have been counted by said second counting means after activation thereof.

2. An electronic system according to claim 1, wherein the memory means is a read only memory.

3. An electronic system according to claim 1, including means for initiating the spark when said preset number of said second signal pulses have been counted by said second counting means, said spark initiating means including: first and second logic gates, the first gate receiving inputs from said second counting means and the output of the second logic gate, and the second gate receiving inputs from the output of the first logic gate and the first pulse generating means; and a transistorized power stage whose collector-emitter path is in series with the primary winding of an ignition coil of the internal combustion engine, the control electrode of said transistorized power stage being connected to the output of the second gate.

4. An electronic system according to claim 1, wherein said means for activating said first counting means includes a counter and a fixed frequency oscillator, said counter and oscillator being enabled by said first signal pulsing from a voltage level representing digital "1" to digital "0", said counter counting a predetermined number of pulses from the oscillator thus providing an output pulse of a predetermined length thereby causing said first counting means to be adivated for said predetermined period of time.

5. An electronic system according to claim 4, wherein said predetermined period of time during which the first counting means is activated is 2 milliseconds.

6. An electronic system according to claim 4, including a NOR gate receiving both an output from said counter which counts the predetermined number of pulses from the oscillator and an said signal pulses whereby said NOR gate allows passage of the second signal pulses to the first counting means only during the predetermined length output from said counter.

7. An electronic system according to claim 6, wherein said NOR gate has a third input from the first voltage signal generating means through a first inverter, and wherein a second inverter inverts the second voltage signals before being applied to the second input of the NOR gate.

8. A digitial electronic ignition system for controlling the ignition timing of an internal combustion engine including: means for generating first and second engine related bistable square wave pulses, the first pulses being in synchronism with the crank-shaft revolutions, and the second pulses being of a frequency which is a multiple of the frequency of said crank-shaft revolutions; first counting means for counting the number of second engine related square wave pulses in a given predetermined time from a first crank-shaft position after top dead center, as determined by a first change in state of a said first engine related square wave pulse; storing means counting means for counting the second engine related square wave pulses from a second predetermined crank-shaft position before top dead center in the next firing cycle, as determined by a second change in state of a said first engine related square wave pulse; and means for initiating the spark when said second counting means has counted the second engine related square wave pulses up to the value stored in said storing means during the previous firing cycle.

9. A digital electronic ignition system according to claim 8, wherein said means for counting the number of second frequency pulses in a given predetermined time comprises a gate circuit which generates a pulse of a predetermined length from the first crank-shaft position, a logic gate receiving on a first input the pulse of predetermined length and on a second input the second frequency pulses, said logic gate being enabled for the duration of said pulse of predetermined length; and a first counter for counting said second frequency pulses for the duration that the logic gate is enabled.

10. A digital electronic ignition system according to claim 9, wherein said storing means for storing this count comprises a read only memory.

11. A digital electronic ignition system according to claim 8, wherein the second frequency pulses are doubled before being stored and counted.

12. A digital electronic ignition system according to claim 8, wherein the means for counting the second frequency pulses is a second counter which is enabled to count the second frequency pulses from the second predetermined crank-shaft position until the stored count has been reached.

13. A digital electronic ignition system according to claim 12, wherein the means for initiating the spark includes first and second logic gates, the first logic gate receiving inputs from the second counter and second logic gate, and the second logic gate receiving inputs from the first logic gate and the first pulse generating means; and a power stage for controlling the current in the primary winding of the ignition coil, the power stage being operated from the output of the second gate.

14. A digital electronic ignition system according to claim 9, wherein said gate circuit includes a counter and a fixed frequency oscillator, said counter and oscillator being enabled at the first crank-shaft position to provide an output pulse of said predetermined length, said counter terminating the output pulse when said counter has counted a predetermined number of the fixed frequency pulses from the oscillator.

15. A digital electronic ignition system according to claim 9, wherein said logic gate is a NOR gate.

16. A digital electronic ignition system according to claim 15, wherein said NOR gate has a third input from the first generating means through an inverter, and wherein the second frequency pulses are inverted before being applied to the second input of said NOR gate.

* * * * *